(12) United States Patent
Ozturk et al.

(10) Patent No.: US 8,483,238 B2
(45) Date of Patent: *Jul. 9, 2013

(54) RADIO LINK CONTROL PROTOCOL DATA UNIT SIZE SELECTION

(75) Inventors: Ozcan Ozturk, San Diego, CA (US); Rohit Kapoor, San Diego, CA (US); Sharad D. Sambhwani, San Diego, CA (US); Etienne F. Chaponniere, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 618 days.

This patent is subject to a terminal disclaimer.

(21) Appl. No.: 12/698,429

(22) Filed: Feb. 2, 2010

(65) Prior Publication Data

US 2011/0188385 A1    Aug. 4, 2011

(51) Int. Cl.
*H04L 12/26* (2006.01)
(52) U.S. Cl.
USPC .......................... 370/469; 370/471; 370/474
(58) Field of Classification Search
None
See application file for complete search history.

(56) References Cited

U.S. PATENT DOCUMENTS

| | | | |
|---|---|---|---|
| 2008/0225893 A1* | 9/2008 | Cave et al. | 370/476 |
| 2008/0227442 A1* | 9/2008 | Pani et al. | 455/422.1 |
| 2009/0274171 A1* | 11/2009 | Lucky | 370/470 |
| 2009/0323601 A1* | 12/2009 | Wu | 370/329 |
| 2010/0272078 A1* | 10/2010 | Pani et al. | 370/336 |
| 2011/0090806 A1* | 4/2011 | Ozturk et al. | 370/252 |
| 2011/0255477 A1* | 10/2011 | Otonari et al. | 370/328 |

FOREIGN PATENT DOCUMENTS

| | | |
|---|---|---|
| EP | 2129009 A1 | 12/2009 |
| WO | 2007091965 A2 | 8/2007 |
| WO | 2009045882 A2 | 4/2009 |

OTHER PUBLICATIONS

International Search Report and Written Opinion—PCT/US2011/023506—ISA/EPO—Jul. 26, 2011.

* cited by examiner

*Primary Examiner* — Min Jung
(74) *Attorney, Agent, or Firm* — Charles Chesney

(57) ABSTRACT

An apparatus for selecting a size of a radio link control (RLC) protocol data unit (PDU) is described. The apparatus includes means for receiving a request for an RLC PDU from a medium access control (MAC) layer. The apparatus further includes means for selecting the size of the RLC PDU. The apparatus also includes means for generating the RLC PDU. The apparatus further includes means for sending the RLC PDU to the MAC layer.

54 Claims, 11 Drawing Sheets

RADIO LINK CONTROL PROTOCOL DATA UNIT SIZE SELECTION

TECHNICAL FIELD

The present disclosure relates generally to communication systems. More specifically, the present disclosure relates to systems and methods for radio link control protocol data unit size selection.

BACKGROUND

Wireless communication systems are widely deployed to provide various types of communication content such as voice, video, data, and so on. These systems may be multiple-access systems capable of supporting simultaneous communication of multiple terminals with one or more base stations.

The term mobile station refers to an electronic device that may be used for voice and/or data communication over a wireless communication network. Examples of mobile stations include cellular phones, personal digital assistants (PDAs), handheld devices, wireless modems, laptop computers, personal computers, etc. A mobile station may alternatively be referred to as an access terminal, a mobile terminal, a subscriber station, a remote station, a user terminal, a terminal, a subscriber unit, user equipment, etc.

A wireless communication network may provide communication for a number of mobile stations, each of which may be serviced by a base station. A base station may alternatively be referred to as an access point, a Node B, or some other terminology.

In the wireless communication network, data may be transmitted between the mobile station and the base station. The data may be transmitted in the form of one or more data packets. A data packet may include data and appropriate data headers. It would be beneficial if improvements were made relating to the communication of data packets.

DETAILED DESCRIPTION

Figure 1:
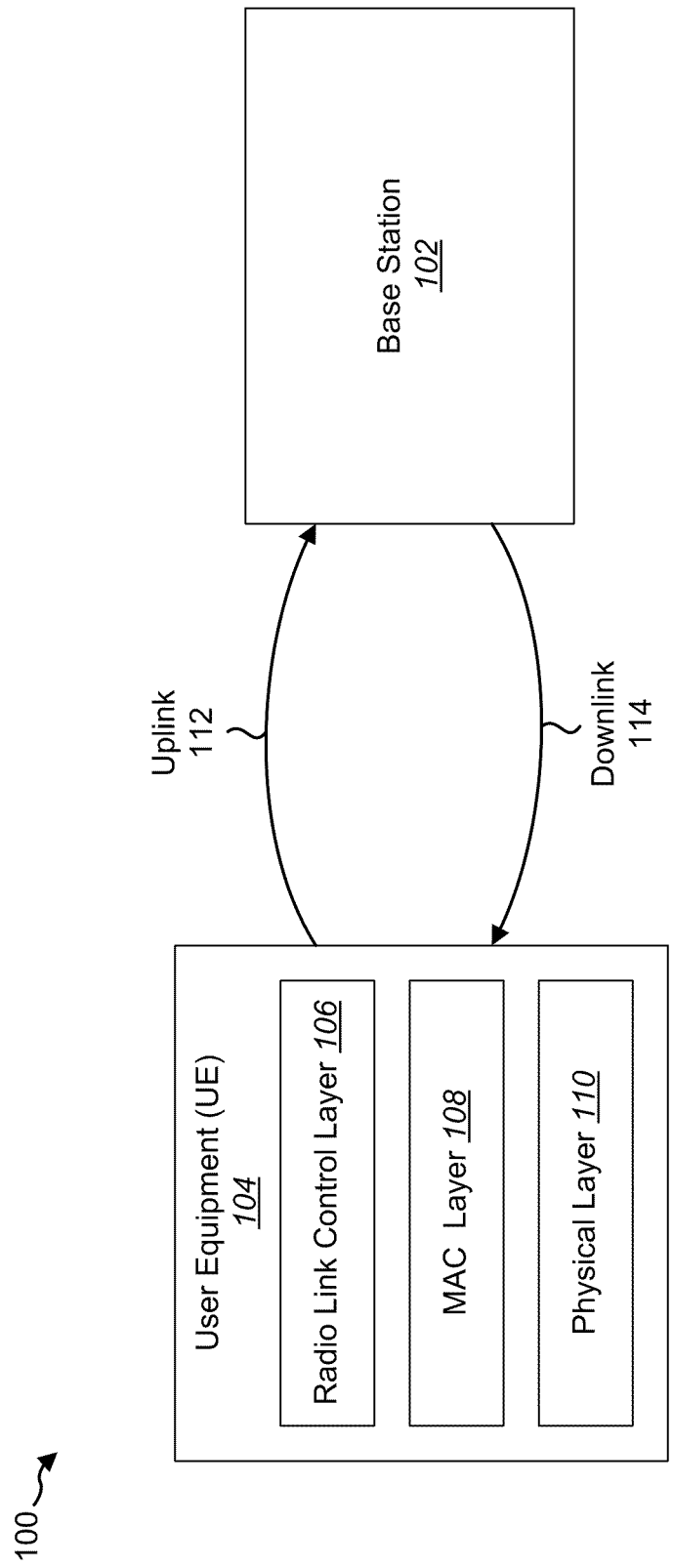
FIG. 1 shows a wireless communication system with multiple wireless devices.

In older $3^{rd}$ Generation Partnership Project (3GPP) releases, only fixed radio link control (RLC) packet sizes were allowed. Although newer releases have allowed flexible RLC packet sizes on the downlink, the standards have not imposed a dynamic selection mechanism according to the channel variations. An RLC packet may be generated in the RLC layer.

By using a flexible size RLC protocol data unit (PDU) on the uplink, important parameters such as the residual error may be reduced or minimized while maintaining some degree of lower header overhead gain. By adjusting the RLC PDU size selection on the uplink according to radio conditions, a wireless communication device may minimize overhead and error. In a fully radio aware method, the wireless communication device may select the size of the RLC PDU so that exactly one RLC PDU is transmitted in a physical layer packet. An RLC PDU is then generated to fit in a medium access channel (MAC) PDU assuming that the traffic buffer has enough data. The benefit of this is that the RLC PDU is not segmented at the MAC layer and thus, the residual error for the first RLC transmission is the same as the physical layer error.

In a partially radio aware method, the RLC PDU size depends on the radio conditions at the generation of the PDU. However, the RLC PDU size is not chosen at the exact time when the physical layer packet size is determined. Instead, the RLC PDU size may be selected based on the minimum and maximum physical packet sizes for preceding time units. The RLC PDU size may also be based on a number of other factors, such as an RLC PDU concatenation threshold, a MAC segment maximum threshold, a residual error threshold and a concatenation and segmentation combined threshold. In the partially radio aware method, the size of the RLD PDU is selected prior to the physical layer packet size determination. The RLC PDU may also be generated prior to the physical layer packet size determination. Once an RLC PDU has been generated, the RLC PDU may then be sent to the MAC layer.

In the following description, for reasons of conciseness and clarity, terminology associated with the LTE standards, as promulgated under the 3rd Generation Partnership Project (3GPP) by the International Telecommunication Union (ITU), is used. It should be noted that the invention is also applicable to other technologies, such as technologies and the associated standards related to Code Division Multiple Access (CDMA), Time Division Multiple Access (TDMA), Frequency Division Multiple Access (FDMA), Orthogonal Frequency Division Multiple Access (OFDMA) and so forth. Terminologies associated with different technologies can vary. For example, depending on the technology considered, a wireless device can sometimes be called a user equipment, a mobile station, a mobile terminal, a subscriber unit, an access terminal, etc., to name just a few. Likewise, a base station can sometimes be called an access point, a Node B, an evolved Node B, and so forth. It here should be noted that different terminologies apply to different technologies when applicable.

FIG. 1 shows a wireless communication system 100 with multiple wireless devices. A wireless device may be a base station 102, a mobile device, a controller, or the like. A base station 102 is a station that communicates with one or more mobile devices. A base station 102 may also be referred to as, and may include some or all of the functionality of, an access point, a broadcast transmitter, a Node B, an evolved Node B, etc. The term "base station" will be used herein. Each base station 102 provides communication coverage for a particular geographic area. A base station 102 may provide communication coverage for one or more mobile devices. The term "cell" can refer to a base station 102 and/or its coverage area depending on the context in which the term is used. Each cell may be further divided into sectors. A base station may thus cover multiple sectors.

A mobile device may also be referred to as, and may include some or all of the functionality of, a terminal, an access terminal, a user equipment (UE) 104, a subscriber unit, a station, etc. A mobile device may be a cellular phone, a personal digital assistant (PDA), a wireless device, a wireless modem, a handheld device, a laptop computer, etc. The term "UE" will be used herein. A UE 104 may communicate with zero, one, or multiple base stations 102 on a downlink 114 and/or an uplink 112 at any given moment. The downlink 114 (or forward link) refers to the communication link from a base station 102 to a UE 104, and the uplink 112 (or reverse link) refers to the communication link from a UE 104 to a base station 102.

The wireless communication system may be a multiple-access system capable of supporting communication with multiple UEs by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, and spatial division multiple access (SDMA) systems.

The wireless communication system may use the High Speed Packet Access (HSPA) mobile telephony protocol as defined in the 3GPP standards. HSPA may improve the performance of W-CDMA protocols. In HSPA, a shorter Transmission Time Interval (TTI) may be used. 3GPP Release 8 allows flexible packet sizes for RLC on the High Speed Uplink Packet Access (HSUPA) portion of HSPA. This makes it possible for the UE to choose the size of the RLC PDU according to radio conditions (e.g., channel variation, grants received).

In previous $3^{rd}$ Generation Partnership Project (3GPP) releases, only fixed sizes for radio link control (RLC) packets were allowed. Although Release 7 allowed flexible sizes on the downlink, the standard did not impose a dynamic size selection mechanism according to the channel variation since the physical layer and the RLC layer reside on different network elements. On the uplink, this is more feasible since both the RLC layers and layers below reside at the mobile.

The UE 102 may include a physical layer 110. The physical layer 110 may include hardware transmission technologies for the wireless communication network 100. For example, the physical layer 110 may include a radio interface allowing wireless communication with a base station 102. The physical layer 110 may interface with a medium access control (MAC) layer 108 on the UE 104. The MAC layer 108 may provide addressing and channel access control mechanisms that facilitate communication with the base station 102 in the wireless communication network 100. The MAC layer 108 may interface with a radio link control (RLC) layer 106 on the UE 104. The RLC layer 106 may receive requests for data packets from the MAC layer 108. In response to these requests, the RLC layer 106 may provide data packets to the MAC layer 108.

Figure 2:
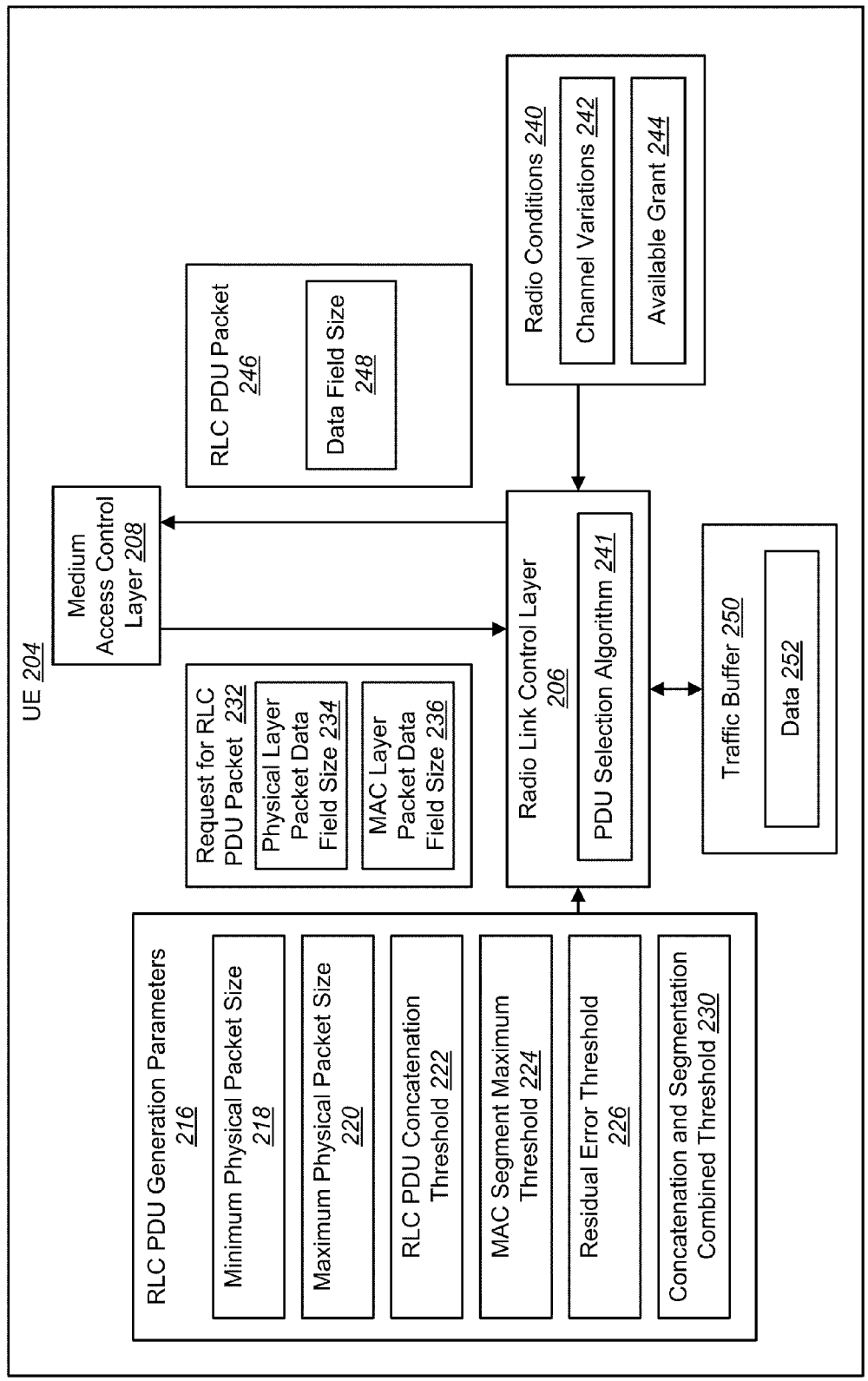
FIG. 2 is a block diagram illustrating data flows on a user equipment (UE) for the generation of a radio link control (RLC) protocol data unit (PDU) packet.

FIG. 2 is a block diagram illustrating data flows on a user equipment (UE) 204 for the generation of a radio link control (RLC) protocol data unit (PDU) packet 246. The UE 204 of FIG. 2 may be one configuration of the UE 204 of FIG. 1. The UE 204 may include a radio link control (RLC) layer 206. The UE 204 may also include a medium access control layer 208. The RLC layer 206 may generate an RLC PDU packet 246. The RLC layer 206 may use a PDU selection algorithm 241 when generating an RLC PDU packet 246. The network 100 may direct the UE 204 to have a residual error less than a residual error threshold 226. Residual error is the error after all the transmission attempts. The physical layer usually operates at a fixed residual error target such as 1%, which is achieved by power control. There may be no error target threshold signaled by the network at the RLC layer 206 for RLC packets. The residual error threshold 226 may then be a desired target. For example, the residual error threshold 226 may guarantee that RLC errors and re-transmissions are minimized and transmission control protocol (TCP) performance does not degrade. As a result, the PDU selection algorithm 241 may operate to have a residual error less than a residual error threshold 226.

The RLC PDU packet 246 may be generated to have a specific data field size 248. The data field size 248 of an RLC PDU packet 246 may correspond to the amount of data in the RLC PDU packet 246. The RLC PDU packet 246 may then be sent to the medium access control layer 208.

The radio link control layer 206 may generate an RLC PDU packet 246 in response to a request 232 for an RLC PDU packet received from the medium access control layer 208. A request 232 for an RLC PDU packet may include a physical layer packet data field size 234. The physical layer packet data field size 234 may indicate the amount of data needed to fill a current physical layer packet. The request 232 for an RLC PDU packet may also include a MAC layer packet data field size 236. The MAC layer packet data field size 236 may indicate the amount of data needed to fill a current MAC layer packet.

The radio link control layer 206 may also generate an RLC PDU packet 246 in anticipation of receiving a request 232 for an RLC PDU packet from the medium access control layer 208. For example, the radio link control layer 206 may receive a request 232 for one or more RLC PDU packets from the medium access control layer 208 for each transmission time interval (TTI). The radio link control layer 206 may generate an RLC PDU packet 246 for a later TTI to increase efficiency.

The radio link control layer 206 may generate the RLC PDU packet 246 using data 252 within a traffic buffer 250. The data 252 within the traffic buffer 250 may be the data used in the data field of the RLC PDU packet 246. The data field size 248 of the RLC PDU packet 246 may correlate with the amount of data 252 available in the traffic buffer 250. The RLC layer 206 may receive data 252 from logical flows. The data 252 from logical flows may come from a packet data convergence protocol (PDCP) layer or a radio resource control (RRC) layer. For example, if there is no header compression, RLC service data units (SDUs) may be transmission control protocol/internet protocol (TCP/IP) packets.

The radio link control layer 206 may select the size 248 of the RLC PDU packet 246 based on RLC PDU generation parameters 216. For example, the radio link control layer 206 may select the size 248 of the RLC PDU packet 246 based on radio conditions 240. The radio conditions 240 may include channel variations 242 and the available serving or non-serving grants 244. Channel variations 242 may be detected by the UE 204 or received from a base station 102 via the downlink 114. Channel variations 242 may include the current uplink 112 transmit power, the current uplink 112 pilot power, the available power in addition to the current uplink 112 pilot power, etc. The available grant 244 may be received from a base station 102 on the downlink 114 via serving and non-serving grants. The available grant 244 may restrict the size of the physical layer packet. The serving grant at the UE 104 may be updated based on grants received from base stations 102 in the active set (in HSPA). In Long Term Evolution (LTE) radio technologies, there may not be an active set. LTE radio technologies may use other signaling which can prompt the UE 104 to update its serving grant. The serving grant determines how much power the UE 104 can use on the uplink. Channel variations may also cause a change in the available power.

The RLC PDU generation parameters 216 may include a minimum physical packet size 218 from among the preceding N time units. The RLC PDU generation parameters 216 may also include a maximum physical packet size 220 from among the preceding N time units. The minimum and maximum physical packet sizes 218, 220 from the preceding N time units may be measured by the UE 204. For example, the UE 204 may store the size for each physical layer packet generated.

The RLC PDU generation parameters 216 may also include an RLC PDU concatenation threshold 222. The RLC PDU concatenation threshold 222 may be received from the base station 102 via the downlink 114. The RLC PDU concatenation threshold 222 may define the maximum number of RLC PDUs allowed to be concatenated within a single physical layer packet.

The RLC PDU generation parameters 216 may further include a MAC segment maximum threshold 224. The MAC segment maximum threshold 224 may be received from the base station 102 via the downlink 114. The MAC segment maximum threshold 224 may define the maximum number of segments that a single RLC PDU packet 246 may be broken into in order to maintain a residual error below the residual error threshold 226. The MAC segment maximum threshold 224 is discussed in further detail below in relation to FIG. 10.

The RLC PDU generation parameters 216 may include a concatenation and segmentation combined threshold 230. The concatenation and segmentation combined threshold 230 may be received from the base station 102 via the downlink 114. The concatenation and segmentation combined threshold 230 may combine the MAC segment restrictions and RLC PDU concatenation restrictions into a single formula or relationship. The concatenation and segmentation combined threshold 230 may define the relationship between the number of MAC segments that a single RLC PDU packet 246 may be broken into and the number of concatenated RLC PDUs generated. For example, the UE 204 may be required to keep the number of MAC segments multiplied by the number of concatenated RLC PDUs (or the filtered output) below the concatenation and segmentation combined threshold 230.

These values (MAC segments, etc.) may change every TTI. Thus, forcing the threshold restriction every TTI may be too restrictive. The value (the number of MAC segments multiplied by the number of concatenated RLC PDUs) may be filtered through an infinite impulse response (IIR) or finite impulse response (FIR) filter, and the output may be compared to the concatenation and segmentation combined threshold 230. This makes it possible for the value to go over the concatenation and segmentation threshold 230 occasionally as long as most values (i.e. the average, depending on the filter parameters) are below the concatenation and segmentation threshold 230. As another example, the UE 204 may be required to keep the number of MAC segments divided by the number of concatenated RLC PDUs less than a fixed percentage above the concatenation and segmentation combined threshold 230. By having less restriction on the number of MAC segments and the number of concatenated RLC PDUs, the UE 204 may have more flexibility when generating an RLC PDU packet 246.

Figure 3:
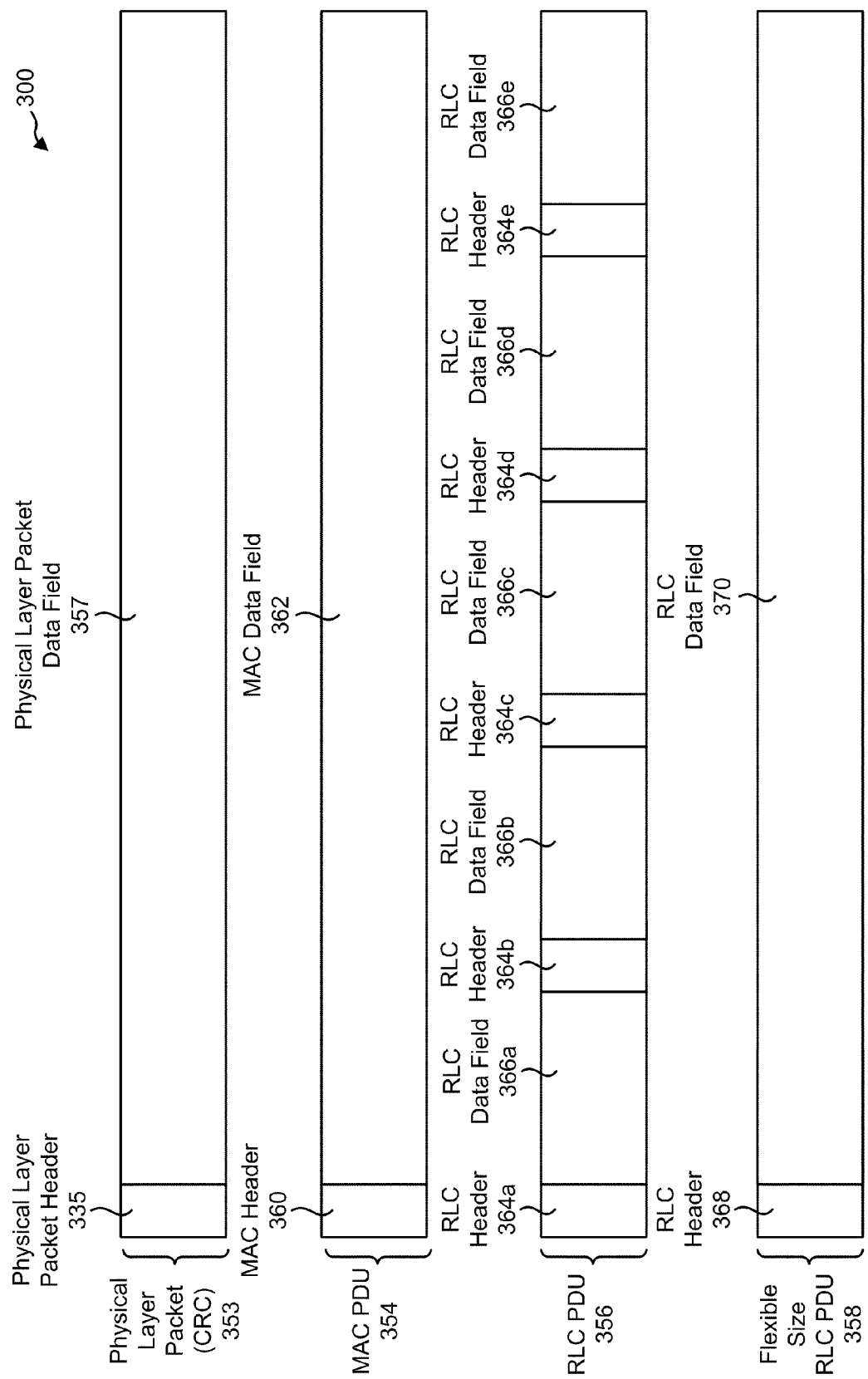
FIG. 3 illustrates a physical layer packet, a medium access control (MAC) PDU, an RLC PDU, and a flexible size RLC PDU for use in the present systems and methods.

FIG. 3 illustrates a physical layer packet 353, a MAC PDU 354, an RLC PDU 356, and a flexible size RLC PDU 358 for use in the present systems and methods. The physical layer packet 353 may be generated by the physical layer 110 of a UE 104. The physical layer packet 353 may include a physical layer packet header 335, a physical layer packet data field 357 and a cyclic redundancy check (CRC). The physical layer packet data field 357 may specify the amount of data that can be sent in the physical layer packet 353. In response to receiving the physical layer packet 353 from the physical layer 110, the MAC layer 108 may generate a MAC PDU 354. The MAC layer 108 may only need to know how many bits are available to be sent in the physical layer. Then, after the MAC PDU 354 is formed, the MAC PDU 354 may be passed to the physical layer. The MAC PDU 354 may include a MAC header 360 and a MAC data field 362. The size of the MAC data field 362 may correspond to the size of the physical layer packet data field 357.

As part of an enhanced transport format combination (E-TFC) selection, the MAC layer 108 may request the RLC layer 106 to provide RLC PDUs 356 to fill the MAC PDU 354. The request may instruct the RLC layer 106 to prepare an RLC PDU 246 which will fill the bits available in the MAC packet. In general, the RLC PDU 246 size does not have to exactly match the available MAC bits since the RLC layer 106 can use the previous N TTI values. The RLC layer 106 may generate an RLC PDU 356 to fill the MAC data field 362. An RLC PDU 356 may include multiple RLC data fields 366a-e if the size of the MAC data field 362 is larger than the size of each RLC data field 366. If the size of the MAC data field 362 is smaller than the size of each RLC data field 366, the RLC data field 366 may be broken into pieces and each piece may be fill a MAC data field 362. Each RLC data field 366 may include a corresponding RLC header 364a-e. The RLC layer 106 may generate a flexible size RLC PDU 358 with a flexible size RLC data field 370. The flexible size RLC PDU 358 may include only a single RLC header 368 and a single RLC data field 370. The decreased number of RLC PDU headers 364 may increase the efficiency of the UE 104.

Figure 4:
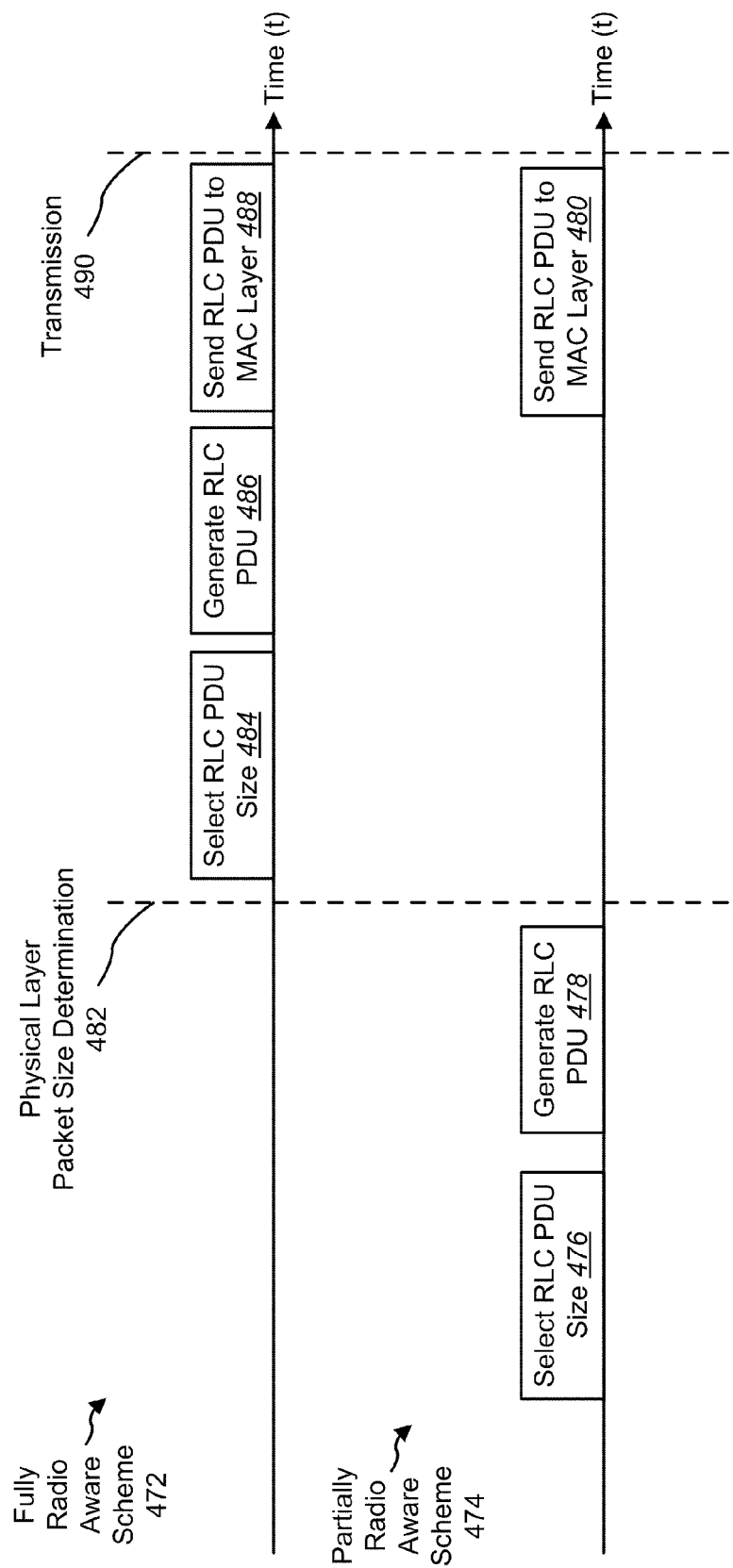
FIG. 4 illustrates the timing structures of a fully radio aware scheme and a partially radio aware scheme as part of generating an RLC PDU.

FIG. 4 illustrates and compares the timing structures of a fully radio aware scheme 472 and a partially radio aware scheme 474 as part of generating an RLC PDU 358. In the fully radio aware scheme 472, the RLC layer 106 may determine 482 the physical layer packet 353 size. The RLC layer 106 may then select 484 an RLC PDU 358 size corresponding to the determined physical layer packet 353 size. In one configuration, the RLC PDU 358 size may be selected such that exactly one RLC PDU 358 is generated to fit in one MAC PDU 354 (minus the size of necessary headers and assuming the traffic buffer 250 has enough data 252). The benefit of such a scheme is that the RLC PDU 358 is not segmented at the MAC layer 108. The RLC residual error for the first transmission may be the same as the physical layer error. The RLC residual error may be the same as the physical layer error if the RLC PDU 358 is sent in one physical layer. If the RLC PDU 358 is segmented into several physical packets, when decoding any of these physical packets fail, the whole RLC PDU 358 decoding fails. For example, if the physical residual error is 0.01 and there are two segments per RLC PDU 358, then the RLC residual error is $1-(1-0.01)^2 \approx 0.02$. In addition, the header overhead is minimal without segmentation since each segment has its own header. The RLC layer 106 may then generate 486 the RLC PDU 358 and send 488 the RLC PDU 358 to the MAC layer 108 prior to transmission 490 of the physical layer packet by the physical layer 110. Additional delays may be necessary to process grants and prepare the packet but these may be assumed to be constant for different UEs 104.

Some UEs 104 may be unable to select 484 an RLC PDU 358 size, generate 486 an RLC PDU 358, and send 488 the RLC PDU 358 to the MAC layer 108 fast enough after determining 482 the physical layer packet 353 size for transmission 490. Thus, in a partially radio aware scheme 474, the RLC layer 106 may select 476 an RLC PDU 358 size prior to the physical layer packet 353 size determination 482. The RLC layer 106 may also generate 478 the RLC PDU 358 prior to the physical layer packet 353 size determination 482. This may ensure that the RLC layer 106 is able to send 480 the RLC PDU 358 to the MAC layer 108 prior to the deadline 490. Alternatively, the RLC layer 106 may generate 478 the RLC PDU 358 after the physical layer packet 353 size determination 482.

In the partially radio aware scheme 474, it may still be necessary that there is a close relationship between the size of the RLC PDU 358 and the size of the physical layer packet 353 in order to have lower residual error and a lower header overhead. When more RLC PDUs 358 are multiplexed, each RLC PDU 358 will have its own header in the MAC PDU 354. Thus, in the partially radio aware scheme 474, the RLC PDU 358 size still depends on the radio conditions 240 but is not chosen at the exact time when the physical layer packet 353 size is determined 482.

Figure 5:
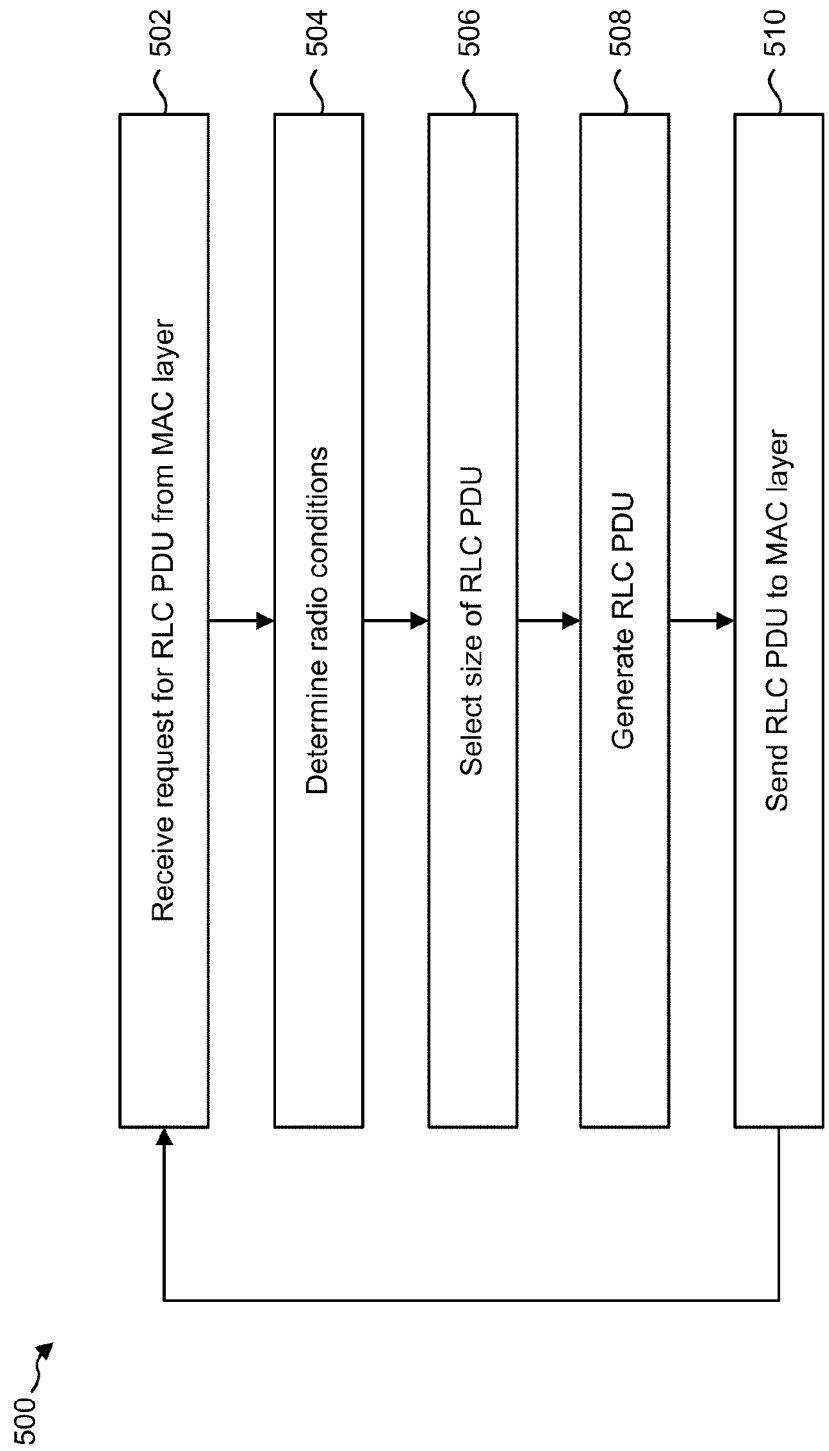
FIG. 5 is a flow diagram of a method for selecting the size of an RLC PDU.

FIG. 5 is a flow diagram of a method 500 for selecting the size of an RLC PDU 358. The method 500 may be performed by the RLC layer 106 as part of a UE 104. The method 500 of FIG. 5 may represent one configuration of a fully radio aware scheme 472 as illustrated in FIG. 4. The RLC layer 106 may receive 502 a request 232 for an RLC PDU 358 from the MAC layer 108. The RLC layer 106 may then determine 504 radio conditions 240. Based on the radio conditions 240, the RLC layer 106 may select 506 the size of an RLC PDU 358. The RLC layer 106 may then generate 508 the RLC PDU 358. The RLC layer 106 may send 510 the generated RLC PDU 358 to the MAC layer 108. This process may be repeated for each TTI.

Figure 6:
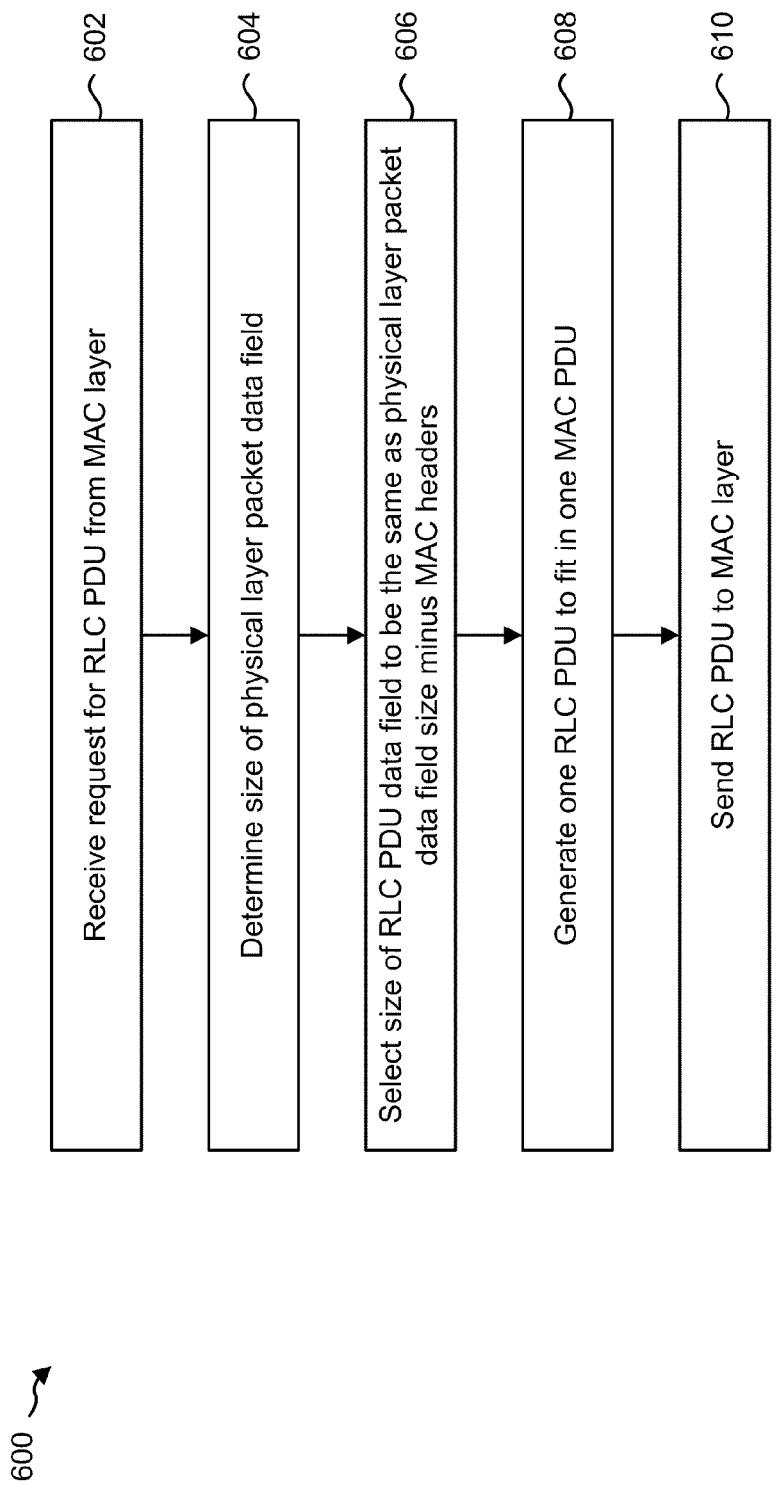
FIG. 6 is a flow diagram of another method for selecting the size of an RLC PDU.

FIG. 6 is a flow diagram of another method 600 for selecting the size of an RLC PDU 358 that may be performed by the RLC layer 106 as part of a UE 104. The method 600 of FIG. 6 may represent one configuration of a fully radio aware scheme 472 as illustrated in FIG. 4. The method 600 FIG. 6 may be used as an alternative to the method 500 of FIG. 5 to select the size of an RLC PDU 358. The RLC layer 106 may receive 602 a request 232 for an RLC PDU 358 from the MAC layer 108. In response to receiving the request 232, the RLC layer 106 may determine 604 the size 234 of a physical layer packet data field 357. For example, the size 234 of the physical layer packet data field 357 may be included with the request 232 received from the MAC layer 108.

The RLC layer 106 may then select 606 the size of the RLC PDU data field 370 to be the same as the physical layer packet data field size 234 minus MAC headers 360. The RLC layer 106 may generate 608 one RLC PDU 358 to fit in one MAC PDU 354. The RLC layer 106 may then send 610 the RLC PDU 358 to the MAC layer 108.

Figure 7:
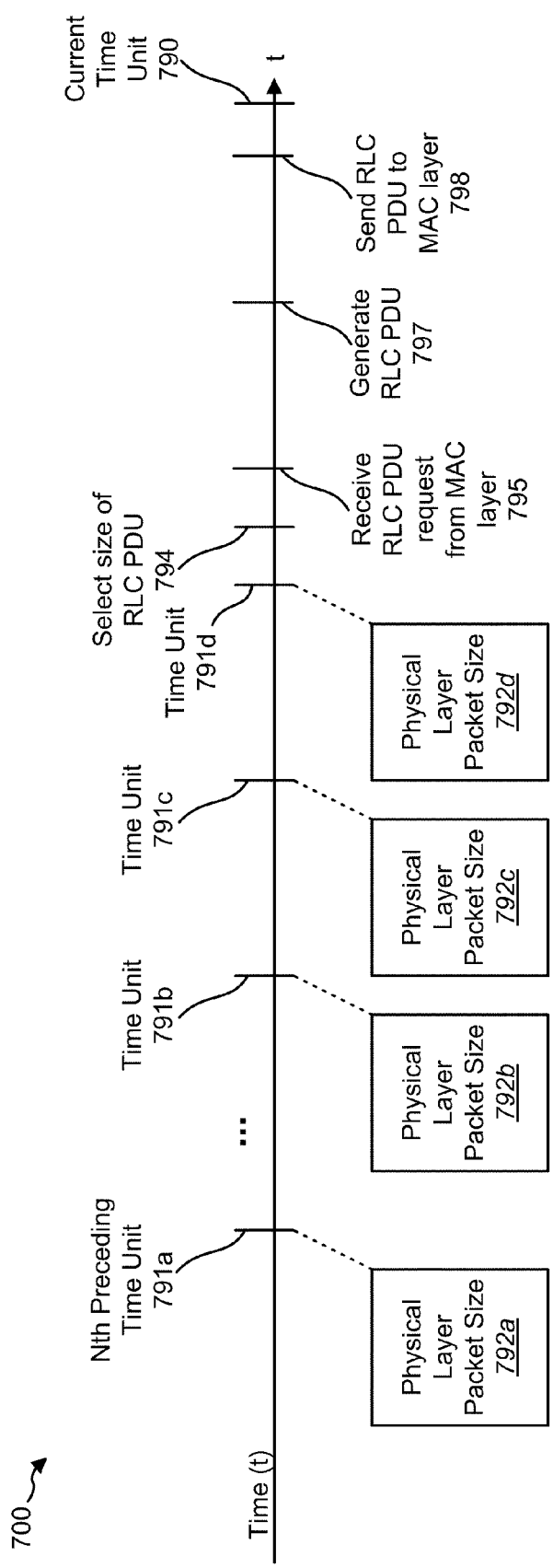
FIG. 7 is a timing diagram illustrating a partially radio aware scheme for use in the present systems and methods.

FIG. 7 is a timing diagram 700 illustrating a partially radio aware scheme for use in the present systems and methods. Each time unit 791a-d may have a physical packet size 792a-d. For example, a physical layer packet 353 having a physical layer packet size 792a may have been sent out at the Nth preceding time unit 791a. One configuration of a time unit 791a-d may be a TTI. The UE 104 may store the physical layer packet sizes 792 for the Nth preceding time units 791. In one configuration, the UE 104 may determine the minimum physical layer packet size 218 and the maximum physical layer packet size 220 from among the stored physical layer packet sizes 792 corresponding to the preceding time units 791.

The RLC layer 106 may select 794 the size of an RLC PDU 358. The RLC layer 106 may select 794 the size of the RLC PDU 358 prior to receiving 795 an RLC PDU request 232 from the MAC layer 108. In one configuration, the size of the RLC PDU 358 may be selected 794 at the same time as a preceding time unit 791. The size of the RLC PDU 358 may be selected 794 according to the physical layer packet size 792 of the preceding time unit 791 when the RLC PDU 358 size is selected. Alternatively, the RLC layer 106 may select 794 the size of the RLC PDU 358 according to the minimum physical layer packet size 218 and maximum physical layer packet size 220 of the N preceding time units 791. This may allow any function (filtering, averaging, etc.) of the set of N values as long as the function is between the minimum and maximum of the set. From the network point of view, one measure of the performance of a partially radio aware scheme is that the residual error of the RLC PDU 358 does not degrade TCP/IP performance.

The RLC layer 106 may then receive 795 an RLC PDU request 232 from the MAC layer 108. After receiving 795 the RLC PDU request 232 from the MAC layer 108, the RLC layer 106 may generate 797 an RLC PDU 358. The size of the generated RLC PDU 358 may be the size previously selected by the RLC layer 106. The RLC layer 106 may then send 798 the RLC PDU 358 to the MAC layer 108. The data within the RLC PDU 358 may then be transmitted as part of a physical layer packet 353 for the current time unit 790.

Figure 8:
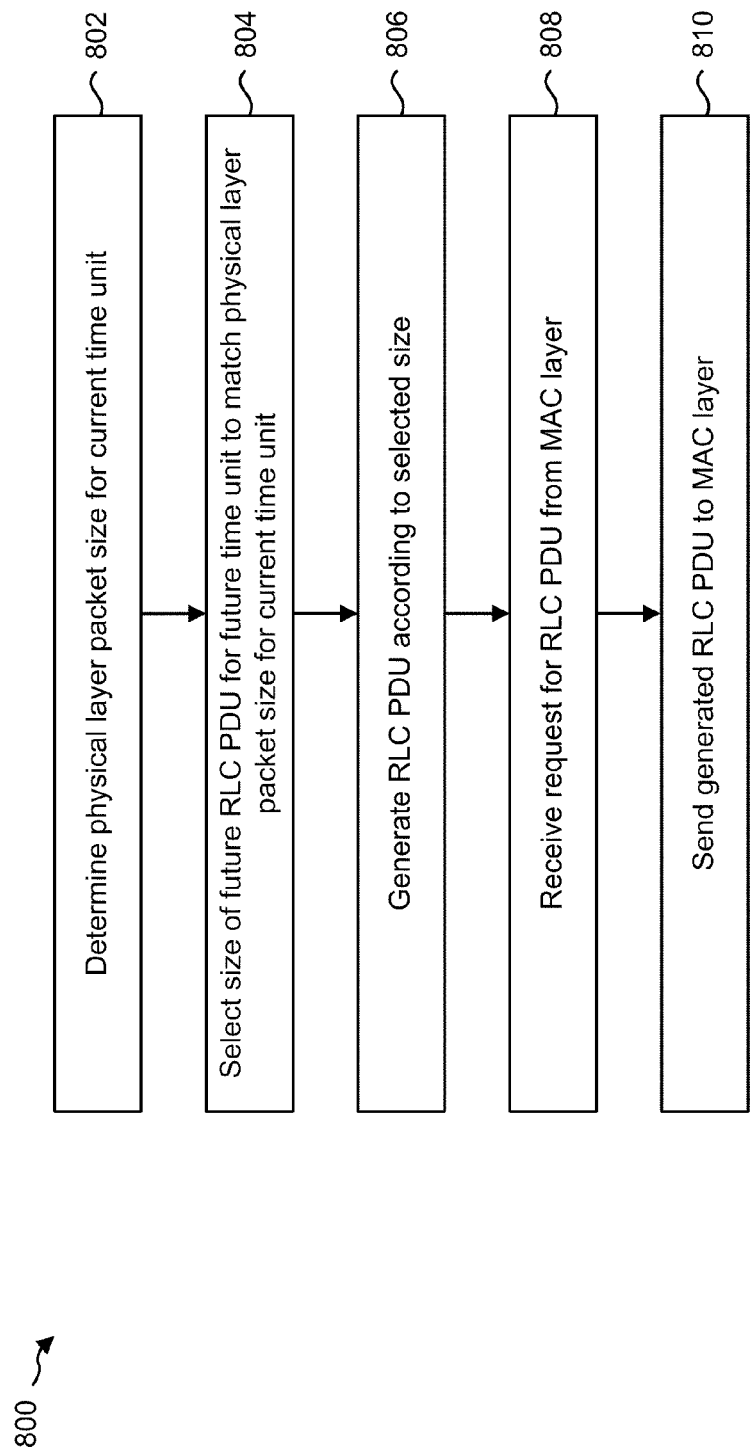
FIG. 8 is a flow diagram of a method for selecting the size of an RLC PDU using a partially radio aware scheme.

FIG. 8 is a flow diagram of a method 800 for selecting the size of an RLC PDU 358 using a partially radio aware scheme. The method 800 of FIG. 8 illustrates the process shown in FIG. 7. The method 800 may be performed by an RLC layer 106 as part of a UE 104. The RLC layer 106 may determine 802 the physical layer packet 353 size for a current time unit. The RLC layer 106 may then select 804 a size of a later RLC PDU 358 for a later time unit to match the physical layer packet 353 size for the current time unit. The RLC layer 106 may then generate 806 the RLC PDU 358 according to the selected size. The RLC layer 106 may receive 808 a request 232 for an RLC PDU 358 from the MAC layer 108. In response to the request 232, the RLC layer 106 may send 810 the generated RLC PDU 358 to the MAC layer 108.

Figure 9:
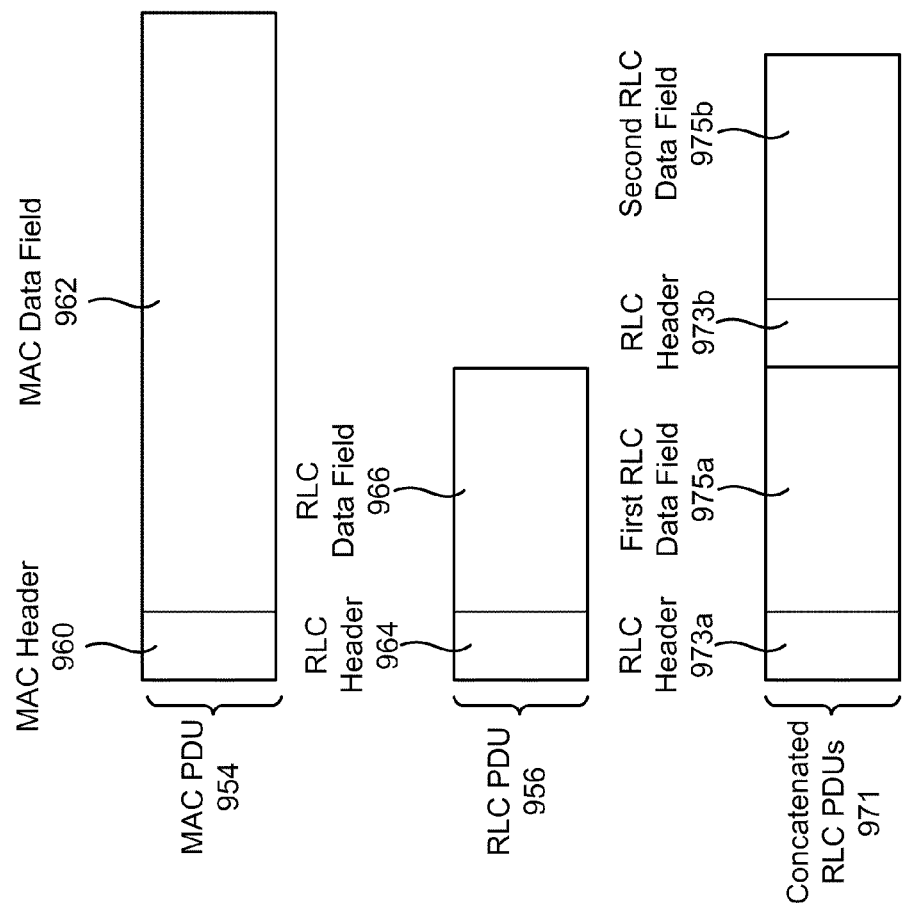
FIG. 9 illustrates concatenated RLC PDUs for use in the present systems and methods.

FIG. 9 illustrates concatenated RLC PDUs 971 for use in the present systems and methods. FIG. 9 illustrates an alternative method for selecting the size of an RLC PDU 971 using a partial radio aware method. A MAC PDU 954 including a MAC header 960 and a MAC data field 962 may be received by an RLC layer 106. In a partially radio aware scheme 474, the RLC layer 106 may have previously generated an RLC PDU 956 having an RLC header 964 and an RLC data field 966. However, the RLC data field 966 may be much smaller than the MAC data field 962. The RLC layer 106 may generate concatenated RLC PDUs 971 having a first RLC header 973a, a first RLC data field 975a, a second RLC header 973b and a second RLC data field 975b concatenated with the first RLC data field 975a. The network 100 may place restrictions on the number of RLC PDUs that may be concatenated 971.

Figure 10:
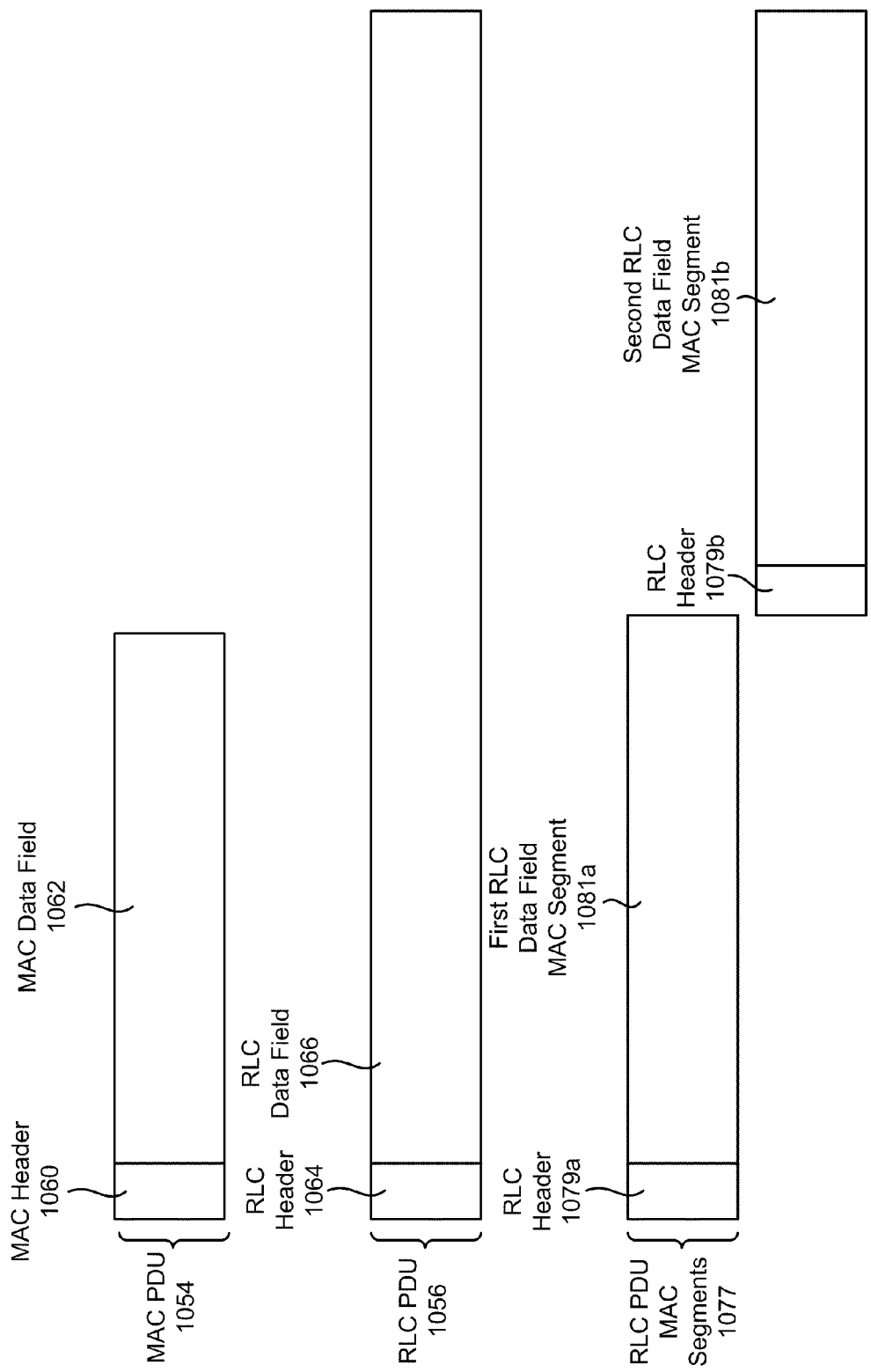
FIG. 10 illustrates MAC segments of an RLC PDU for use in the present systems and methods.

FIG. 10 illustrates MAC segments 1081 of an RLC PDU 1077 for use in the present systems and methods. A MAC PDU 1054 including a MAC header 1060 and a MAC data field 1062 may be received by an RLC layer 106. In a partially radio aware scheme 474, the RLC layer 106 may have previously generated an RLC PDU 1056 having an RLC header 1064 and an RLC data field 1066. However, the RLC data field 1066 may be much larger than the MAC data field 1062. The RLC layer 106 may separate the RLC data field 1066 into a first RLC data field MAC segment 1081*a* and a second RLC data field MAC segment 1081*b* as part of RLC PDU MAC segments 1077. Each RLC PDU MAC segment 1081 may include an RLC header 1079*a*, 1079*b*.

The network 100 may place restrictions on the number of MAC segments 1081 of an RLC PDU 1056 to ensure that the residual error is less than a residual error threshold 226. Assuming that the physical layer errors are independent and identically distributed, the physical layer errors may be calculated using $1-(1-p)^n$, where n is the number of MAC segments 1081 of an RLC PDU 1056 and p is the probability that a physical transmission fails. The network 100 may set a condition for the UE 104 that the value of n or the filtered output of n be less than a MAC segment maximum threshold 224.

In one configuration, the network 100 may set a condition for the UE 104 using a combination of the MAC segment conditions and the RLC PDU concatenation conditions. For example, the UE 104 may be required to keep the value of the number of MAC segments 1081 selected divided by the number of RLC PDUs concatenated 971 to be less than a concatenation and segmentation combined threshold 230.

Figure 11:
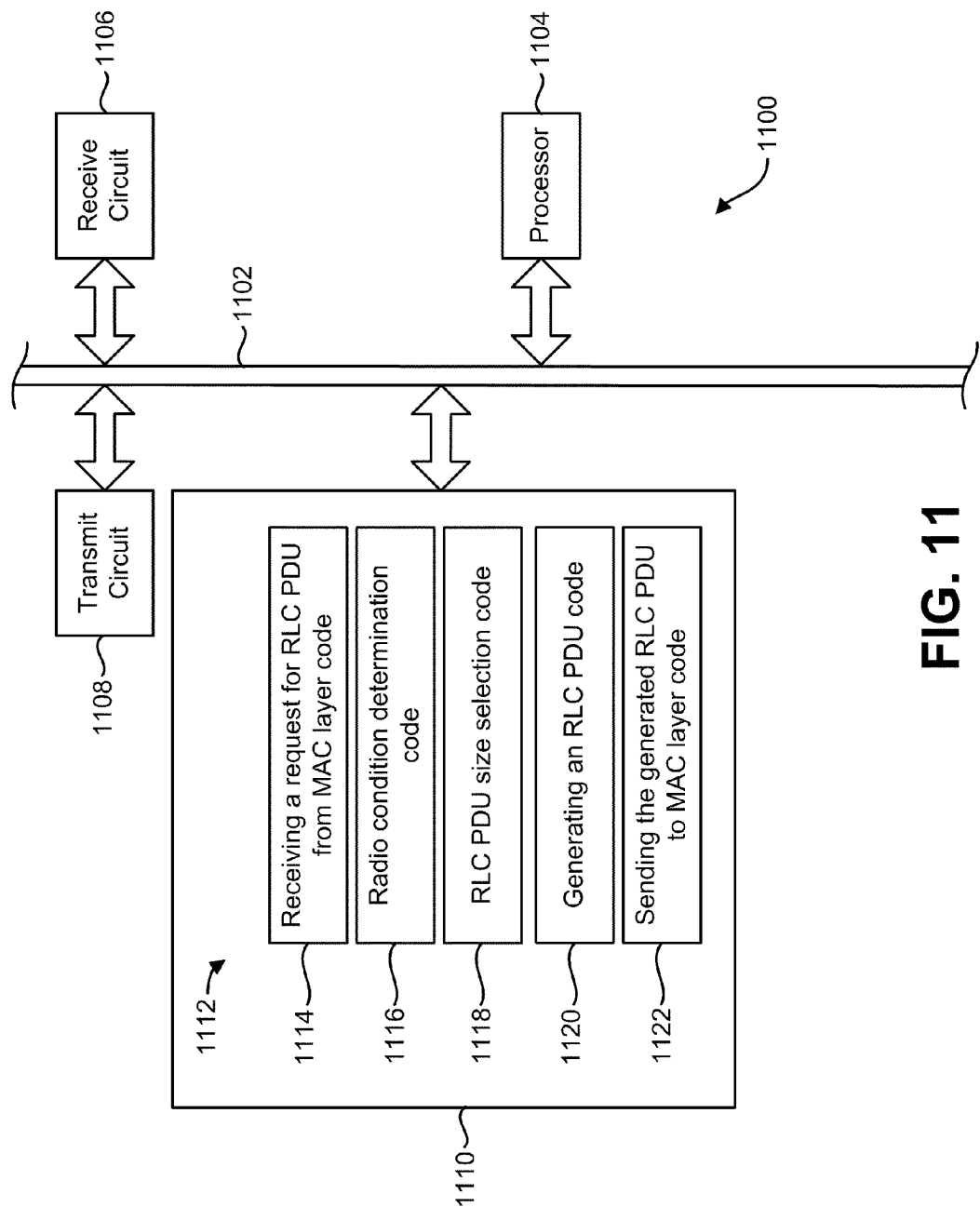
FIG. 11 shows part of a hardware implementation of an apparatus that is configured to facilitate RLC PDU size selection.

FIG. 11 shows part of a hardware implementation of an apparatus 1100 that is configured to facilitate RLC PDU size selection. The circuit apparatus is signified by the reference numeral 1100 which includes circuitry and may be one configuration of a UE 104. In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks and the like, such as shown and described in FIG. 11.

The apparatus 1100 comprises a central data bus 1102 linking several circuits together. The circuits include a processor 1104, a receive circuit 1106, a transmit circuit 1108, and memory 1110. The memory 1110 is in electronic communication with the processor 1104, i.e., the processor 1104 can read information from and/or write information to the memory 1110.

The processor 1104 may be a general purpose processor, a central processing unit (CPU), a microprocessor, a digital signal processor (DSP), a controller, a microcontroller, a state machine, an application specific integrated circuit (ASIC), a programmable logic device (PLD), a field programmable gate array (FPGA), etc. The processor 1104 may include a combination of processing devices, e.g., a combination of a DSP and a microprocessor, a plurality of microprocessors, one or more microprocessors in conjunction with a DSP core, or any other such configuration.

The receive circuit 1106 and the transmit circuit 1108 can be connected to an RF (Radio Frequency) circuit, but that is not shown in the drawing. The receive circuit 1106 may process and buffer received signals before sending the signals out to the data bus 1102. On the other hand, the transmit circuit 1108 may process and buffer the data from the data bus 1102 before sending the data out of the device 1100. The processor 1104 may perform the function of data management of the data bus 1102 and further the function of general data processing, including executing the instructional contents of the memory 1110.

Instead of separately disposed as shown in FIG. 11, as an alternative, the transmit circuit 1108 and the receive circuit 1106 may be part of the processor 1104.

The memory unit 1110 includes a set of instructions generally signified by the reference numeral 1112. The instructions 1112 may be executable by the processor 1104 to implement the methods described herein. The instructions 1112 may include code 1114 for receiving a request for an RLC PDU from a MAC layer. The instructions 1112 may also include code 1116 for determining radio conditions. The instructions 1112 may further include code 1118 for selecting a size of an RLC PDU. The instructions 1112 may also include code 1120 for generating an RLC PDU. The instructions 1112 may further include code 1122 for sending the generated RLC PDU to the MAC layer.

The instructions 1112 shown in the memory 1110 may comprise any type of computer-readable statement(s). For example, the instructions 1112 in the memory 1110 may refer to one or more programs, routines, sub-routines, modules, functions, procedures, data sets, etc. The instructions 1112 may comprise a single computer-readable statement or many computer-readable statements.

The memory 1110 may be a RAM (Random Access Memory) circuit. The memory 1110 can be tied to another memory circuit (not shown) which can either be of the volatile or nonvolatile type. As an alternative, the memory 1110 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art. The memory 1110 may be considered to be an example of a computer-program product that comprises a computer-readable medium with instructions 1112 stored therein.

The functions described herein may be implemented in hardware, software, firmware, or any combination thereof. If implemented in software, the functions may be stored as one or more instructions on a computer-readable medium. The term "computer-readable medium" or "computer program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for using a flexible size radio link control (RLC) protocol data unit (PDU) for a time unit on an uplink, comprising:
    means for receiving a request for an RLC PDU from a medium access control (MAC) layer;
    means for selecting a size of the RLC PDU including means for selecting a size of an RLC PDU data field to be equal to a size of a physical layer packet data field minus at least one of physical layer headers and MAC layer headers;
    means for generating the RLC PDU; and
    means for sending the RLC PDU to the MAC layer.

2. The apparatus of claim 1, further comprising means for determining the size of a physical layer packet data field.

3. The apparatus of claim 2, wherein the size of the RLC PDU data field is also restricted by a maximum amount of data allowed to be transmitted by an applicable current grant for a current transmission time interval (TTI).

4. The apparatus of claim 3, wherein the means for generating the RLC PDU comprises means for generating one RLC PDU to fit in a MAC PDU.

5. The apparatus of claim 3, wherein the TTI is a time unit.

6. The apparatus of claim 1, further comprising means for determining a radio condition, and wherein the means for selecting the size of the RLC PDU uses the radio condition.

7. The apparatus of claim 6, wherein the radio condition comprises channel variations.

8. The apparatus of claim 6, wherein the radio condition comprises an available grant.

9. The apparatus of claim 1, wherein the means for selecting the size of the RLC PDU comprises means for selecting a size of a later RLC PDU for a later time unit to match a physical layer packet size of a current time unit.

10. The apparatus of claim 9, wherein the means for selecting a size of a later RLC PDU for a later time unit comprises means for selecting a size of a later RLC PDU to be less than a maximum physical packet size from preceding N time units.

11. The apparatus of claim 9, wherein the means for selecting a size of a later RLC PDU for a later time unit comprises means for selecting a size of a later RLC PDU to be greater than a minimum physical packet size from preceding N time units.

12. The apparatus of claim 9, wherein the means for selecting a size of a later RLC PDU for a later time unit comprises means for selecting a size of a later RLC PDU such that a number of MAC segments of the later RLC PDU is less than a MAC segment maximum threshold.

13. The apparatus of claim 9, wherein the means for selecting a size of a later RLC PDU for a later time unit comprises means for selecting a size of a later RLC PDU such that a number of MAC segments of the later RLC PDU is greater than a MAC segment minimum threshold.

14. The apparatus of claim 9, wherein the means for selecting a size of a later RLC PDU for a later time unit comprises means for selecting a size of a later RLC PDU such that a number of concatenated RLC PDUs of the later RLC PDU is less than an RLC PDU concatenation threshold.

15. The apparatus of claim 9, wherein the means for selecting a size of a later RLC PDU for a later time unit comprises means for selecting a size of a later RLC PDU such that a combination of a number of MAC segments of the later RLC PDU and a number of concatenated RLC PDUs is less than a concatenation and segmentation combined threshold.

16. The apparatus of claim 1, wherein the apparatus is a user equipment (UE).

17. An apparatus for using a flexible size radio link control (RLC) protocol data unit (PDU) for a time unit on an uplink, comprising:
    circuitry configured to receive a request for an RLC PDU from a medium access control (MAC) layer, to select a size of the RLC PDU including selecting a size of an RLC PDU data field to be equal to a size of a physical layer packet data field minus at least one of physical layer headers and MAC layer headers, to generate the RLC PDU, and to send the RLC PDU to the MAC layer.

18. The apparatus of claim 17, wherein the circuitry is further configured to determine the size of a physical layer packet data field.

19. The apparatus of claim 18, wherein the size of the RLC PDU data field is also restricted by a maximum amount of data allowed to be transmitted by an applicable current grant for a current transmission time interval (TTI).

20. The apparatus of claim 19, wherein the circuitry is further configured to generate one RLC PDU to fit in a MAC PDU.

21. The apparatus of claim 19, wherein the TTI is a time unit.

22. The apparatus of claim 17, wherein the circuitry is further configured to determine a radio condition and to use the radio condition.

23. The apparatus of claim 22, wherein the radio condition comprises channel variations.

24. The apparatus of claim 22, wherein the radio condition comprises an available grant.

25. The apparatus of claim 17, wherein the circuitry is further configured to select a size of a later RLC PDU for a later time unit to match a physical layer packet size of a current time unit.

26. The apparatus of claim 25, wherein the circuitry is further configured to select a size of a later RLC PDU to be less than a maximum physical packet size from preceding N time units.

27. The apparatus of claim 25, wherein the circuitry is further configured to select a size of a later RLC PDU to be greater than a minimum physical packet size from preceding N time units.

28. The apparatus of claim 25, wherein the circuitry is further configured to select a size of a later RLC PDU such that a number of MAC segments of the later RLC PDU is less than a MAC segment maximum threshold.

29. The apparatus of claim 25, wherein the circuitry is further configured to select a size of a later RLC PDU such that a number of MAC segments of the later RLC PDU is greater than a MAC segment minimum threshold.

30. The apparatus of claim 25, wherein the circuitry is further configured to select a size of a later RLC PDU such that a number of concatenated RLC PDUs of the later RLC PDU is less than an RLC PDU concatenation threshold.

31. The apparatus of claim 25, wherein the circuitry is further configured to select a size of a later RLC PDU such that a combination of a number of MAC segments of the later RLC PDU and a number of concatenated RLC PDUs is less than a concatenation and segmentation combined threshold.

32. The apparatus of claim 17, wherein the apparatus is a user equipment (UE).

33. A method for using a flexible size radio link control (RLC) protocol data unit (PDU) for a time unit on an uplink, comprising:
    receiving a request for an RLC PDU from a medium access control (MAC) layer;
    selecting a size of the RLC PDU including means for selecting a size of an RLC PDU data field to be equal to a size of a physical layer packet data field minus at least one of physical layer headers and MAC layer headers;
    generating the RLC PDU; and
    sending the RLC PDU to the MAC layer.

34. The method of claim 33, further comprising determining a size of the physical layer packet data field.

35. The method of claim 34, wherein the size of the RLC PDU data field is also restricted by the maximum amount of data allowed to be transmitted by an applicable current grant for a current transmission time interval (TTI).

36. The method of claim 35, wherein generating the RLC PDU comprises generating one RLC PDU to fit in a MAC PDU.

37. The method of claim 35, wherein the TTI is a time unit.

38. The method of claim 33, further comprising determining a radio condition, wherein the radio condition is used in selecting the size of the RLC PDU.

39. The method of claim 38, wherein the radio condition comprises channel variations.

40. The method of claim 38, wherein the radio condition comprises an available grant.

41. The method of claim 33, wherein selecting the size of the RLC PDU comprises selecting a size of a later RLC PDU for a later time unit to match a physical layer packet size of a current time unit.

42. The method of claim 41, wherein selecting a size of a later RLC PDU for a later time unit comprises selecting a size of a later RLC PDU to be less than a maximum physical packet size from preceding N time units.

43. The method of claim 41, wherein selecting a size of a later RLC PDU for a later time unit comprises selecting a size of a later RLC PDU to be greater than a minimum physical packet size from preceding N time units.

44. The method of claim 41, wherein selecting a size of a later RLC PDU for a later time unit comprises selecting a size of a later RLC PDU such that a number of MAC segments of the later RLC PDU is less than a MAC segment maximum threshold.

45. The method of claim 41, wherein selecting a size of a later RLC PDU for a later time unit comprises selecting a size of a later RLC PDU such that a number of MAC segments of the later RLC PDU is greater than a MAC segment minimum threshold.

46. The method of claim 41, wherein selecting a size of a later RLC PDU for a later time unit comprises selecting a size of a later RLC PDU such that a number of concatenated RLC PDUs of the later RLC PDU is less than an RLC PDU concatenation threshold.

47. The method of claim 41, wherein selecting a size of a later RLC PDU for a later time unit comprises selecting a size of a later RLC PDU such that a combination of a number of MAC segments of the later RLC PDU and a number of concatenated RLC PDUs is less than a concatenation and segmentation combined threshold.

48. A computer-program product for using a flexible size radio link control (RLC) protocol data unit (PDU) for a time unit on an uplink, the computer-program product comprising a computer-readable medium having instructions thereon, the instructions comprising:
    code for receiving a request for an RLC PDU from a medium access control (MAC) layer;
    code for selecting a size of the RLC PDU including means for selecting a size of an RLC PDU data field to be equal to a size of a physical layer packet data field minus at least one of physical layer headers and MAC layer headers;
    code for generating the RLC PDU; and
    code for sending the RLC PDU to the MAC layer.

49. The computer-program product of claim 48, further comprising code for determining a size of a physical layer packet data field.

50. The computer-program product of claim 48, further comprising code for determining a radio condition, and wherein the code for selecting the size of the RLC PDU uses the radio condition.

51. An apparatus for using a flexible size radio link control (RLC) protocol data unit (PDU) for a time unit on an uplink, comprising:
    means for receiving a request for an RLC PDU from a medium access control (MAC) layer;
    means for selecting a size of a later RLC PDU for a later time unit to match a physical layer packet size of a current time unit;
    means for generating the RLC PDU; and
    means for sending the RLC PDU to the MAC layer.

52. An apparatus for using a flexible size radio link control (RLC) protocol data unit (PDU) for a time unit on an uplink, comprising:
    circuitry configured to receive a request for an RLC PDU from a medium access control (MAC) layer, to select a size of a later RLC PDU for a later time unit to match a physical layer packet size of a current time unit, to generate the RLC PDU, and to send the RLC PDU to the MAC layer.

53. A method for using a flexible size radio link control (RLC) protocol data unit (PDU) for a time unit on an uplink, comprising:
    receiving a request for an RLC PDU from a medium access control (MAC) layer;
    selecting a size of a later RLC PDU for a later time unit to match a physical layer packet size of a current time unit;
    generating the RLC PDU; and
    sending the RLC PDU to the MAC layer.

54. A computer-program product for using a flexible size radio link control (RLC) protocol data unit (PDU) for a time unit on an uplink, the computer-program product comprising a computer-readable medium having instructions thereon, the instructions comprising:
    code for receiving a request for an RLC PDU from a medium access control (MAC) layer;
    code for selecting a size of a later RLC PDU for a later time unit to match a physical layer packet size of a current time unit;
    code for generating the RLC PDU; and
    code for sending the RLC PDU to the MAC layer.

* * * * *